(12) United States Patent
Loth et al.

(10) Patent No.: US 9,281,905 B2
(45) Date of Patent: Mar. 8, 2016

(54) ELECTRICAL INSULATION CONFIGURATION FOR AN ELECTRICAL DEVICE

(71) Applicants: Michael Loth, Germantown, WI (US); Daniel L. Stewart, Mequon, WI (US); Raymond Sladky, Grafton, WI (US); Daniel Pixler, West Bend, WI (US)

(72) Inventors: Michael Loth, Germantown, WI (US); Daniel L. Stewart, Mequon, WI (US); Raymond Sladky, Grafton, WI (US); Daniel Pixler, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 204 days.

(21) Appl. No.: 13/770,723

(22) Filed: Feb. 19, 2013

(65) Prior Publication Data
US 2014/0001382 A1    Jan. 2, 2014

Related U.S. Application Data

(60) Provisional application No. 61/665,735, filed on Jun. 28, 2012.

(51) Int. Cl.
| | |
|---|---|
| *H04B 10/00* | (2013.01) |
| *H04B 10/80* | (2013.01) |
| *H02H 1/00* | (2006.01) |
| *H02H 5/12* | (2006.01) |

(52) U.S. Cl.
CPC .............. *H04B 10/802* (2013.01); *H02H 1/00* (2013.01); *H02H 5/12* (2013.01)

(58) Field of Classification Search
CPC ........ H04B 10/80; H04B 10/802; H02H 1/00; H02H 9/00
USPC ........... 250/551, 214 R; 361/23, 43; 307/326; 324/551
See application file for complete search history.

(56) References Cited

U.S. PATENT DOCUMENTS 4,178,617 A * 12/1979 Reichel ............................ 361/43
4,768,125 A *  8/1988 Byrne .............................. 361/32

OTHER PUBLICATIONS

Been, et al., Designing Medical Devices for Isolation and Safety, EDN, May 24, 2007, pp. 75-78.
Avago Technologies, Safety Considerations When Using Optocouplers and Alternative Isolators for Providing Protection Against Electrical Hazards, White Paper, pp. 1-6, Copyright 2005-2010 Avago Technologies, AV02-1909EN-Jan. 29, 2010.
Khan, Optocouplers for Variable Speed Motor Control Electronics in Consumer Home Appliances, White Paper, pp. 1-22, Copyright 2006-2010 Avago Technologies Limited, Obsoletes 5989-1059EN AV02-2420EN-Mar. 23, 2010.

* cited by examiner

*Primary Examiner* — Kevin Pyo
(74) *Attorney, Agent, or Firm* — Quarles & Brady LLP

(57) ABSTRACT

An electrical insulation configuration for an electrical device having a power circuit includes a first insulation device to provide a level of basic insulation between the power circuit and a user, and an additive insulation device in series with the first insulation device, the additive insulation device to increase the level of basic insulation to a level of double insulation or reinforced insulation between the power circuit and the user.

19 Claims, 5 Drawing Sheets

ELECTRICAL INSULATION CONFIGURATION FOR AN ELECTRICAL DEVICE

CROSS-REFERENCE TO RELATED APPLICATIONS

This application claims the benefit of U.S. Provisional Patent Application Ser. No. 61/665,735, filed Jun. 28, 2012, and entitled "ELECTRICAL INSULATION CONFIGURATION FOR AN ELECTRICAL DEVICE," which is hereby incorporated by reference.

STATEMENT REGARDING FEDERALLY SPONSORED RESEARCH OR DEVELOPMENT

Not applicable.

BACKGROUND OF THE INVENTION

The subject matter disclosed herein relates generally to an electrical insulation configuration for an electrical device, and, more particularly, to an electrical insulation configuration to provide electrical insulation between a power circuit and a user.

The use of ac-line-powered electrical devices, such as commercial devices, medical devices, and industrial equipment potentially exposes users of these devices to the possibility of electrical contact, burns, etc. due to the possibility of a breakdown in electrical insulation. As a result, many regulations from agencies ranging from the US FDA (Food and Drug Administration), European Commission, UL (Underwriters Laboratories Inc.), CSA (Canadian Standards Association) and other safety and regulatory bodies ensure that these devices comply with appropriate safety standards. For example, IEC (International Electrotechnical Commission) 60601-1 defines medical-equipment electrical-safety conditions necessary to protect patients, operators, and the surroundings, and IEC 61800-5-1 establishes electrical safety requirements for variable speed drives.

In electrical equipment, designers can isolate touch-safe low voltage circuitry from high-voltage circuitry using devices which provide electrical isolation such as optocouplers or transformers. The devices used to provide isolation between low voltage and high voltage circuits typically employ an insulation system based upon air spacings and solid insulation. When air is used as insulation between conductors such as component leads, the electrical safety standards require a minimum distance through air (clearance) and over an insulating surface (creepage). Likewise, when solid insulation such as plastic or ceramic is used between conductors, the standards require the insulating material to satisfy performance requirements determined by tests such as an AC voltage test, impulse test, or partial discharge test.

For example, for a 690V inverter, IEC 61800-5-1 requires 8 mm clearance between power circuits and the grounded chassis of the inverter; this is called "basic" insulation. However, devices such as optocouplers, when used to provide isolation between power circuits and low voltage circuits which are accessible to the user, must provide 14 mm clearance between the emitter and detector leads of the device. This increased insulation requirement is called "reinforced" or "double" insulation. A variety of ratings exist for optocouplers. For example, 8 mm, 14 mm, and larger optocouplers exist, but getting into the 14 mm size causes the optocouplers to be bulky and expensive.

It would, therefore, be desirable to provide a reinforced or double level of insulation using smaller, less expensive insulation devices, yet achieve a higher insulation rating.

BRIEF DESCRIPTION OF THE INVENTION

The present embodiments overcomes the aforementioned problems by providing an additive insulation device to an insulation configuration.

In accordance with one embodiment of the invention, an electrical insulation configuration for an electrical device having a power circuit includes a first insulation device to provide a level of basic insulation between the power circuit and a user, and an additive insulation device in series with the first insulation device, the additive insulation device to increase the level of basic insulation to a level of double insulation between the power circuit and the user.

In accordance with another embodiment of the invention, a variable frequency drive includes control circuitry coupled to a power circuit, a power module and an inverter. The control circuitry can include a control pod and a gate driver circuit, the control pod to provide control signals to the gate driver circuit. The control circuitry can include a first insulation device to provide a level of basic insulation between the power circuit and a user of the variable frequency drive. The control circuitry can also include an additive insulation device, the additive insulation device to increase the level of basic insulation to a level of double insulation or reinforced insulation between the power circuit and the user of the variable frequency drive, the additive insulation being electrically positioned between the control pod and the gate driver circuit.

In accordance with another embodiment of the invention, a method for providing additive insulation to an electrical device having a power circuit includes providing a first insulation device for providing a level of basic insulation between the power circuit and a user, and providing an additive insulation device in series with the first insulation device, the additive insulation device for increasing the level of basic insulation to a level of double insulation between the power circuit and the user.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

Figure 1:
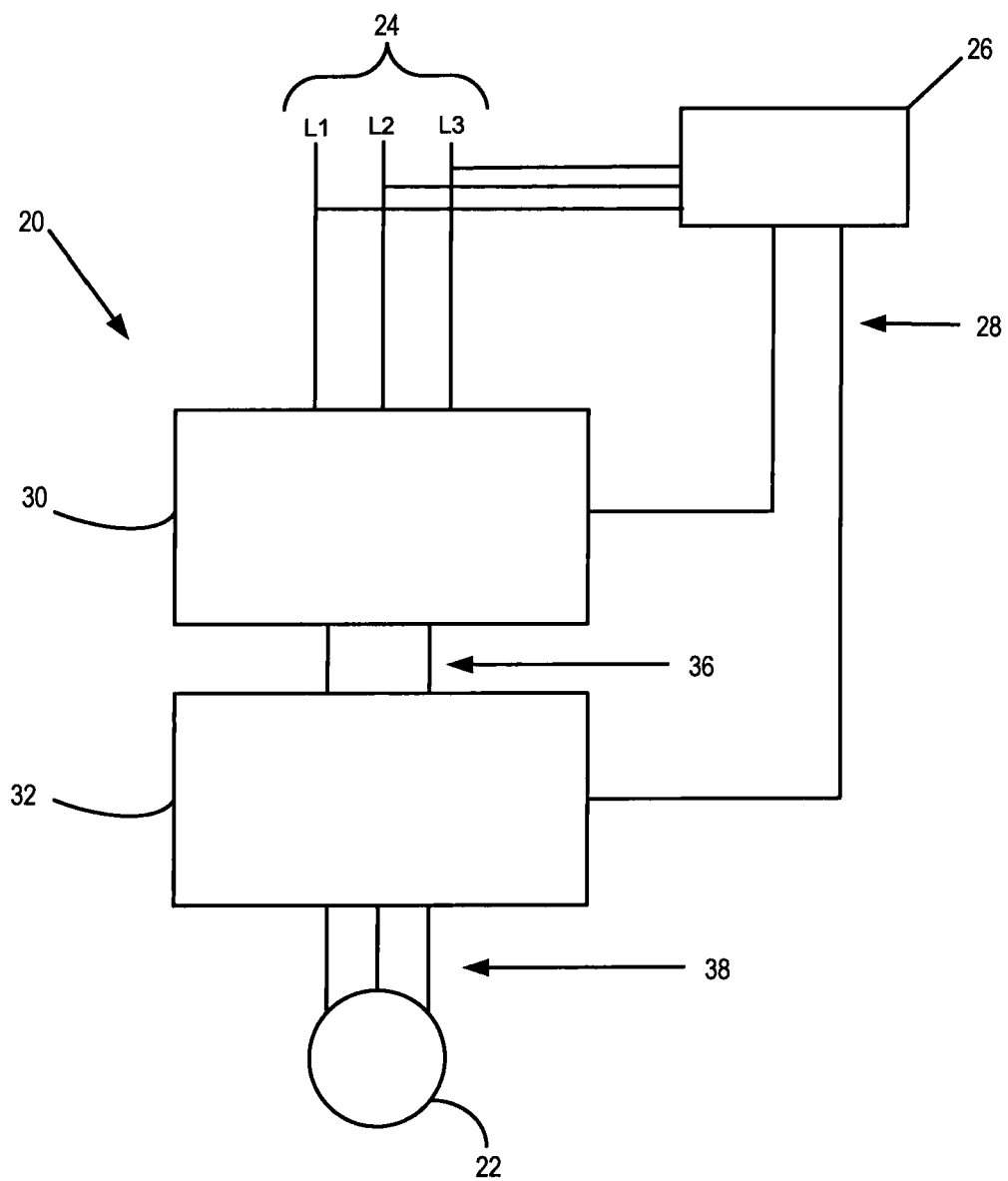
FIG. 1 is a circuit diagram of an exemplary motor drive configuration including power modules coupled to a three phase power source and a motor, with control circuitry coupled to the three phase power source and the power modules.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

The various embodiments of the invention will be described in connection with an optical insulation configuration for a variable speed motor drive. That is because the features and advantages of the invention are well suited for this purpose. Still, it should be appreciated that the various aspects of the invention can be applied in other forms and in other electronic devices that are coupled to a voltage level that may be insulated.

As used herein, various embodiments will be described herein using at least one optocoupler, also called opto-isolator, to provide optical insulation. As used herein, an optocoupler can be an electronic component that transfers an electrical signal or voltage from one part of a circuit to another, or from one circuit to another, while electrically isolating the two circuits from each other. Typically, an optocoupler comprises an infrared emitting LED chip that is optically in-line with a light-sensitive silicon semiconductor chip, all enclosed in the same package. A variety of configurations of optocouplers are known. It is to be appreciated that magnetic isolators, capacitor-coupled isolators, and magnetoresistance isolator technologies may be used in place of or in addition to optocoupler insulators discussed herein.

In terms of electrical insulation, functional, basic, and reinforced insulation, also known as double insulation, are important safety features of UL and CE standards. Certain required levels of electrical insulation insures that when a user is or could be in contact with an electronic device that is electrically coupled to a level of voltage that may pose a voltage potential, the user can be isolated from the voltage potential. It is to be appreciated that the terms insulation and isolation would be known to one of skill in the art to be able to be used interchangeably to describe types of electrical separation.

Turning now to the drawings, and referring initially to FIG. 1, an exemplary simplified block diagram of an electrical device is shown. In this example, the electrical device is a motor drive configuration 20 that can provide alternating current (AC) electric power to an AC electric motor 22 as is known in the art. Electric power can be provided to the motor drive configuration 20 from a three phase AC input power source 24 comprising AC power source lines L1, L2, and L3. Three phase AC power from the input power source 24 can be provided to a control circuit 26. The control circuit 26 can provide control signals 28 to a power module 30 and an inverter 32. The power module 30 then produces a DC voltage on a DC bus 36 as is known in the art. Power modules are also known in the art as IGBTs, bridge rectifiers or SCR bridges, for example.

The DC voltage on the DC bus 36 can then be received by the inverter 32 that synthesizes a new three-phase power 38 provided to the AC motor 22. By converting the original three-phase power to DC and then back into three-phase AC power 38, the frequency, amplitude, and phase of the motor voltages and currents may be adjusted for precise motor control.

In other motor drive configurations, DC power from the DC bus 36 can be applied to a DC motor in a manner known in the art in order to provide DC power of appropriate amplitude and phase to a DC motor in a controlled fashion.

Figure 2:
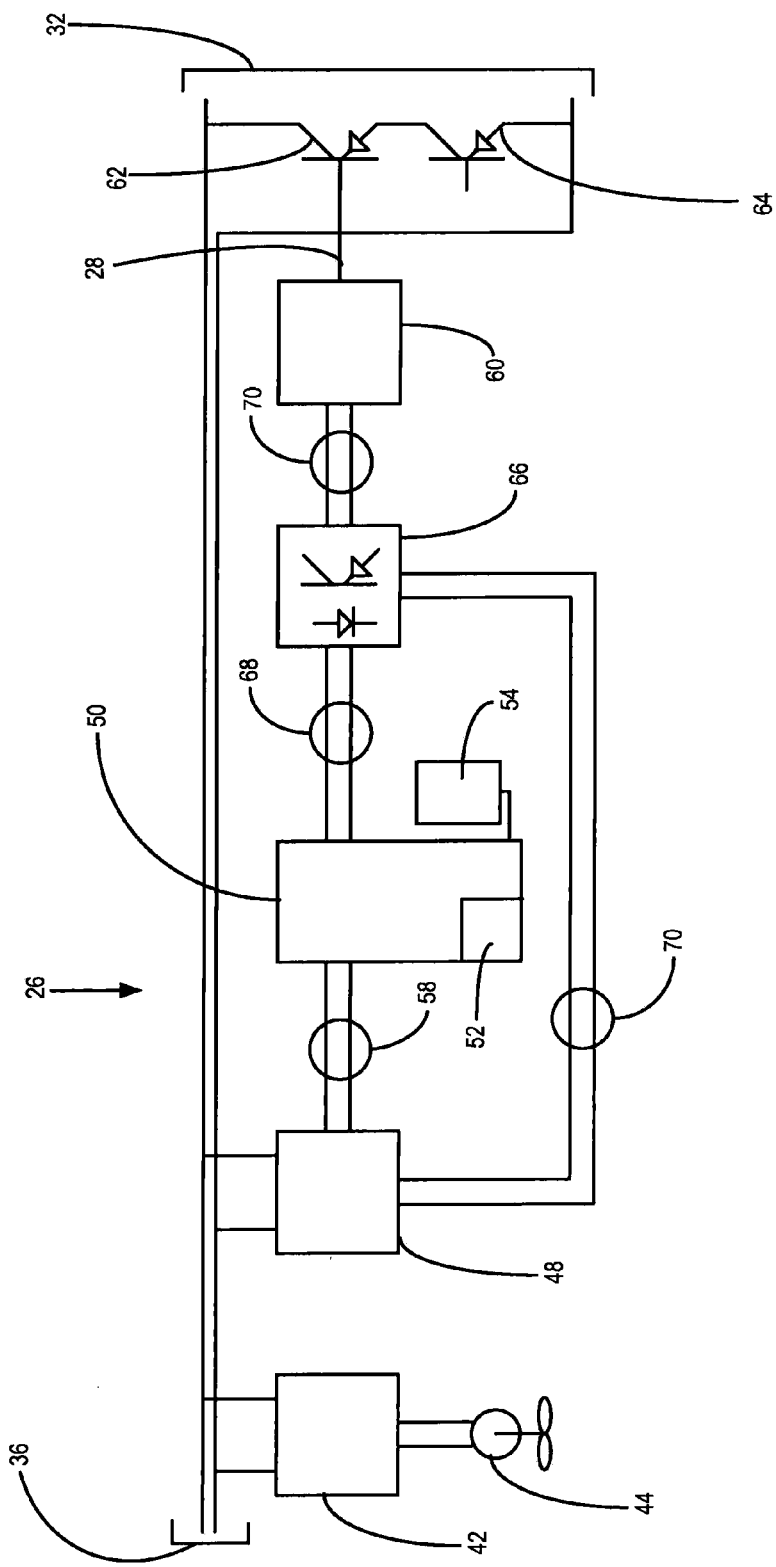
FIG. 2 is a block diagram of a portion of an electrical device that includes optical insulation.

FIG. 2 illustrates a simplified block diagram of a portion of the motor drive configuration 20 of FIG. 1. The block diagram of FIG. 2 shows an exemplary embodiment of a control circuit 26 usable with the motor drive configuration 20, or other motor drive configurations. In this embodiment, electric power can be provided to the motor drive configuration 20 from a 480 VAC input power source 24, although other voltages are possible. As can be seen, in this embodiment, power for the control circuit 26 can be provided from the DC bus 36. The DC bus 36 can be a source of high voltage, and therefore a basic level of insulation is preferably provided with the motor drive configuration 20 to reduce the level of voltage potential to a user of the motor drive configuration.

The control circuit 26 can draw power from the DC bus 36. Additional devices, such as a fan power supply 42 can also draw power from the DC bus 36. The fan power supply 42 can reduce the high voltage DC bus 36 down to a lower voltage level to supply a fan 44. Depending on the configuration of the fan power supply 42 and fan 44, insulation may be provided between the high voltage DC bus 36 and the lower voltage level supplied to the fan 44.

As part of the control circuit 26, a control power supply 48 can draw power from the DC bus 36. The control power supply 48 can reduce the high voltage DC bus 36 down to a lower voltage level to supply other control devices, such as a control pod 50. The control pod 50 can provide a user interface 52 to the motor drive configuration 20. Alternatively, or in addition to, a human interface module 54 can be coupled to the control pod 50 to allow a user to interact with the control pod 50 of the motor drive configuration 20. The control power supply 48 can provide a basic level of solid insulation between the high voltage DC bus 36 and a user accessible lower voltage (UALV) 58 supplied to the control pod 50.

Based on user input to the control pod 50, and/or the human interface module 54, the control pod 50 can provide the control signals 28 to a gate driver circuit 60 to control the operation of the inverter 32. The inverter 32 is shown including only two IGBTs 62 and 64 for simplicity, although more are commonly used as is known in the art. An optocoupler 66 can be positioned between the control pod 50 and the gate driver circuit 60 to provide a basic level of insulation. For example, the optocoupler 66 can be a HCNW3120 optocoupler, for example, from Avago Technologies that can provide 8 mm of creepage clearance and 8 KV of impulse voltage protection. The optocoupler 66 isolates a UALV 68 from the control pod 50 and a high voltage power 70 provided by the control power supply 48 to the optocoupler 66. The UALV 58 and the UALV 68 need not be at the same lower voltage potential. The high voltage power 70 can also be present between the optocoupler 66 and the gate driver circuit 60.

Figure 3:
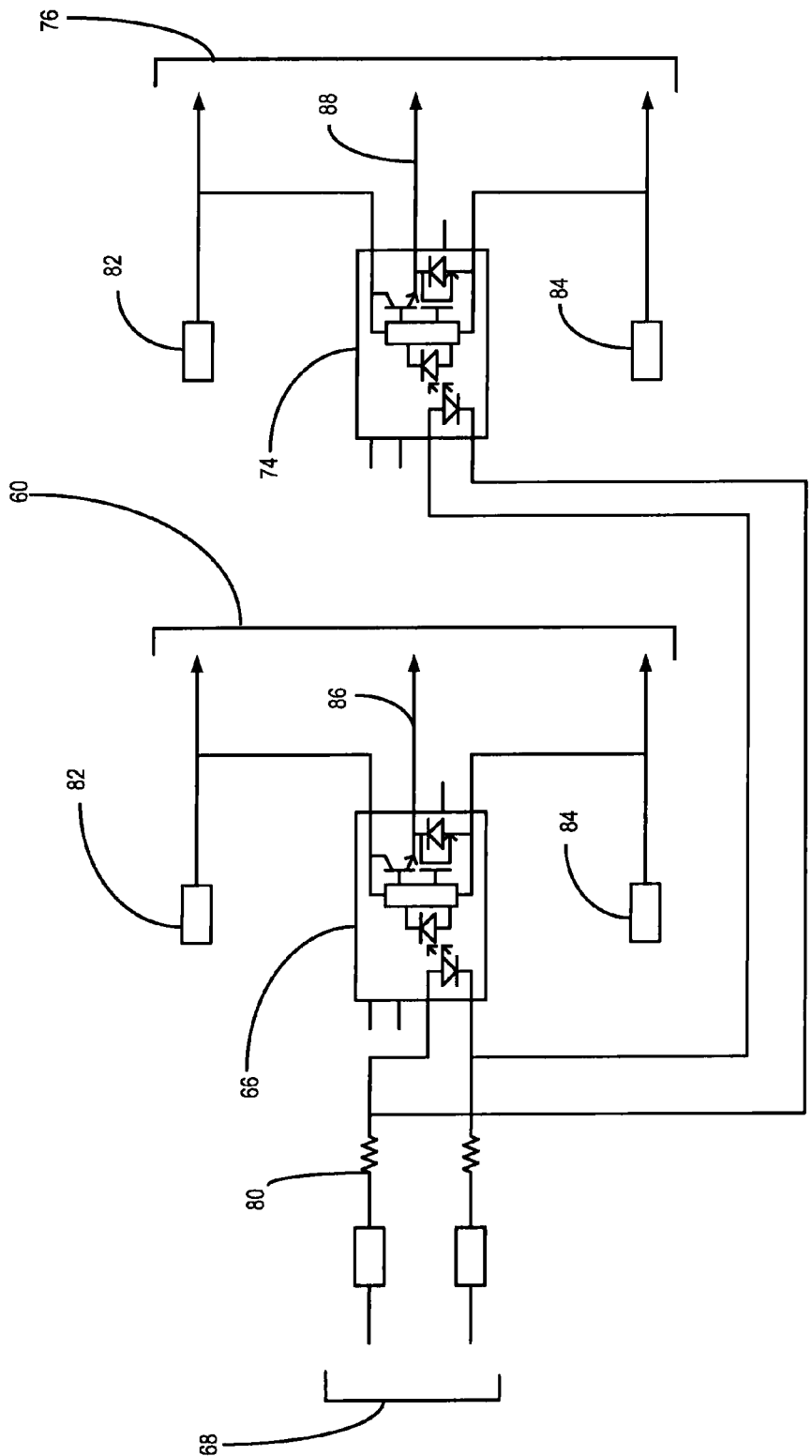
FIG. 3 is a wiring diagram of a portion of the block diagram of FIG. 2.

FIG. 3 illustrates a more detailed wiring diagram of a portion of the block diagram of FIG. 2. Specifically, FIG. 3 illustrates the wiring of the optocoupler 66 coupled to the gate driver circuit 60 for IGBT 62, and an optocoupler 74 coupled to a gate driver circuit 76 for IGBT 64. As can be seen, the UALV 68 can be coupled to both optocouplers 66 and 74. Resistors 80 may be included in line with the UALV 68.

Low voltage power 68 can be provided to both optocouplers 66 and 74 in the form of a low voltage power 82 and a low voltage return 84. Low voltage power 82 and low voltage return 84 are also provided to the gate driver circuit 60 and the gate driver circuit 76, along with gate driver signal 86 for the gate driver circuit 60, and gate driver signal 88 for the gate driver circuit 76.

Figure 4:
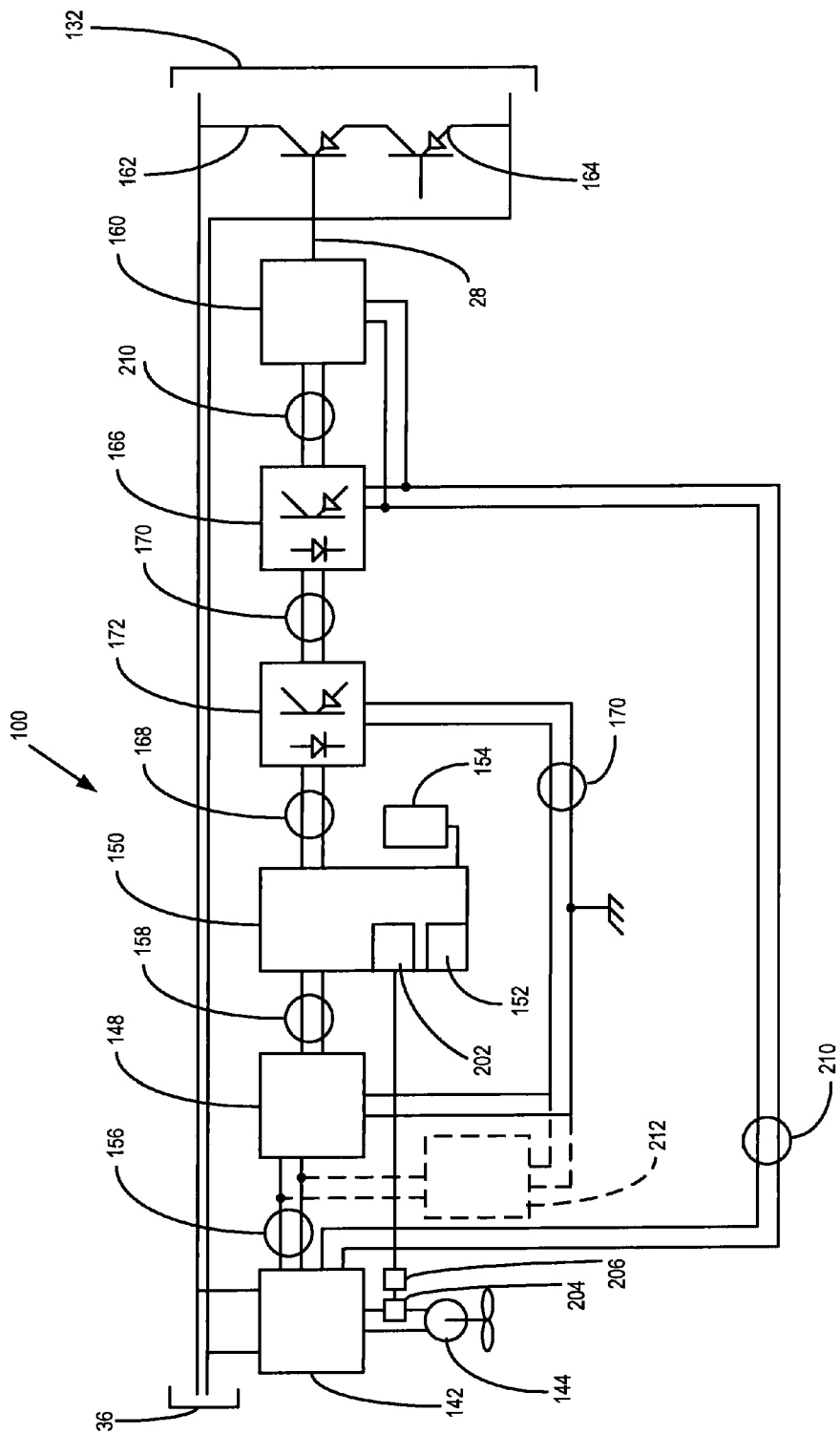
FIG. 4 is a block diagram of a portion of an electrical device showing an embodiment of an additive optical insulation implementation according to an embodiment of the invention.

Referring now to FIG. 4, an exemplary embodiment of a control circuit 100 usable with the motor drive configuration 20, or other motor drive configurations, incorporates additive insulation (e.g., optical insulation) according to embodiments of the invention. In this embodiment, electric power can be provided to the motor drive configuration 20 from a 690 VAC input power source 24, although other voltages are possible.

As can be seen, in this embodiment, power for the control circuit 100 can be provided from the DC bus 36. The DC bus 36 can be a source of high voltage, and therefore a reinforced or double level of insulation is preferably provided with the motor drive configuration 20 to reduce the level of voltage potential to a user of the motor drive configuration.

The control circuit 100 can draw power from the DC bus 36. Additional devices, such as a fan power supply 142 can also draw power from the DC bus 36. The fan power supply 142 can reduce the high voltage DC bus 36 down to a lower voltage level to supply a fan 144. Depending on the configuration of the fan power supply 142 and fan 144, isolation may be provided between the high voltage DC bus 36 and the lower voltage level supplied to the fan 144.

As part of the control circuit 100, a control power supply 148 can draw a low voltage power 156 from the fan power supply 142. In one embodiment, a basic level of optical insulation can be provided by the fan power supply 142. The fan power supply 142 can serve as a first stage of basic insulation. The control power supply 148 can serve as the second stage of basic insulation for the user accessible lower voltage (UALV) 158 to supply other control devices, such as a control pod 150. The control pod 150 can provide a user interface 152 to the motor drive configuration 20. Alternatively, or in addition to, a human interface module 154 can be coupled to the control pod 150 to allow a user to interact with the control pod 150 of the motor drive configuration 20.

Based on user input to the control pod 150, and/or the human interface module 154, the control pod 150 provides the control signals 28 to a gate driver circuit 160 to control the operation of the inverter 132. The inverter 132 is shown including only two IGBTs 162 and 164 for simplicity.

In one embodiment, the control pod 150 can also include a fan control circuit 202. The fan control circuit 202 can couple to a fan controller 204 in line with the fan 144 to provide user control of the fan 144. In order to maintain a basic level of insulation, a fan optocoupler 206 can be included between the fan controller 204 and the fan control circuit 202.

In addition to the optocoupler 166 positioned between the control pod 150 and the gate driver circuit 160 to provide a basic level of insulation, an additive optocoupler 172 can be included in series with the optocoupler 166. The additive optocoupler 172 can increase the level of insulation to a reinforced or double insulation level. For example, the optocoupler 166 can be a HCNW3120 optocoupler from Avago Technologies that can provide 8 mm of creepage clearance and 8 KV of impulse voltage protection. The additive optocoupler 172 can be a ACPL-W611 optocoupler, for example, also from Avago Technologies, that can provide an additive 8 mm of creepage clearance and 8 KV of impulse voltage protection between the control pod 150 and the gate driver circuit 160. These two optocouplers 166 and 172 in series provide an additive creepage clearance and impulse voltage protection to achieve a reinforced or double level of insulation. It is to be appreciated that other optocouplers may be used.

The optocoupler 166 isolates a low voltage power 170 from the additive optocoupler 172 and a low voltage power 210 provided by the fan power supply 142. The additive optocoupler 172 isolates a UALV 168 from the control pod 150 and the low voltage power 170 provided by the control power supply 148. Optionally, a linear regulator 212 can be used to provide power to the additive optocoupler 172. The linear regulator can reduce the low voltage power 156 down to a lower voltage, e.g., 5 VDC. Use of the linear regulator 212 can reduce the need for a transformer winding, saving space and cost. The UALV 158 and the UALV 168 need not be at the same lower voltage potential. The low voltage power 156 and the low voltage power 170 need not be at the same low voltage potential. The low voltage power 170 can be present between the additive optocoupler 172 and the optocoupler 166.

For a 690V inverter, standards such as IEC 61800-5-1 require 8 mm optocouplers to provide a basic insulation between power circuits and the user, and 14 mm optocouplers to provide reinforced or double insulation between the power circuits and the user. In this example with a 690 VAC input power source 24, the insulation necessary to achieve a reinforced or double level is 14 mm of creepage clearance and an impulse voltage protection of 12 KV. Thus, a reinforced or double level of insulation between the control pod 150, which can be user accessible, and the power source 24 can be met or exceeded with the additive optocoupler 172 in combination with the optocoupler 166.

Figure 5:
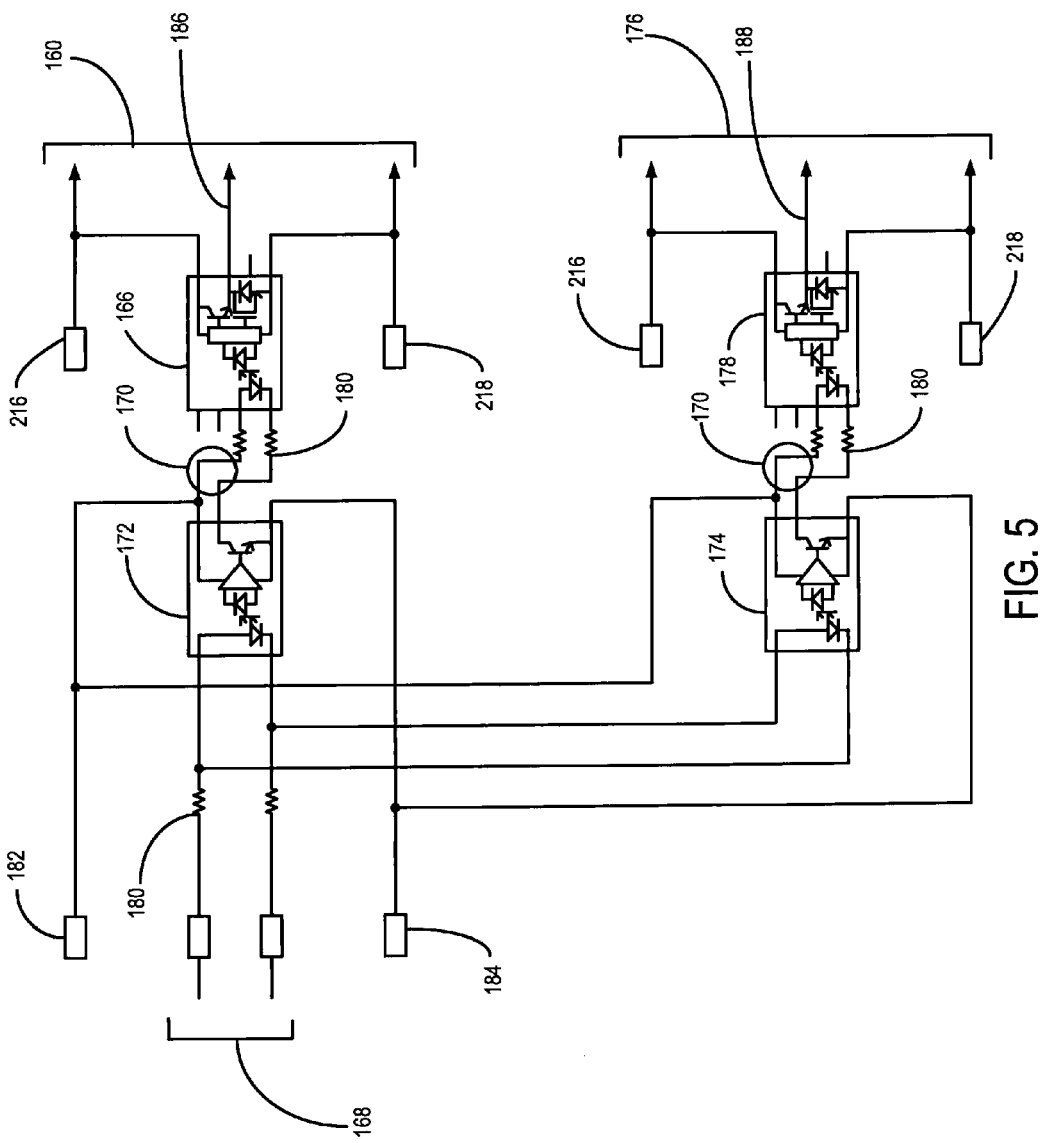
FIG. 5 is a wiring diagram of a portion of the block diagram of FIG. 4, showing the additive optical insulation implementation according to an embodiment of the invention.

FIG. 5 illustrates a more detailed wiring diagram of a portion of the block diagram of FIG. 4. Specifically, FIG. 5 illustrates the wiring of the additive optocoupler 172 in series with the optocoupler 166, and coupled to the gate driver circuit 160 for IGBT 162, and an additive optocoupler 174 in series with an optocoupler 178, and coupled to a gate driver circuit 176 for IGBT 164. As can be seen, the UALV 168 can be coupled to both additive optocouplers 172 and 174. In some embodiments, resistors 180 can be included in line with the UALV 168, and resistors 180 can be included in line with the low voltage power 170 between the additive optocoupler 172 and the optocoupler 166.

The low voltage power 170 can be provided to both additive optocouplers 172 and 174 in the form of a low voltage power 182 and a low voltage return 184. The low voltage power 210 can be provided to the gate driver circuit 160 and the gate driver circuit 176 in the form of a low voltage power 216 and low voltage return 218, along with gate driver signal 186 for the gate driver circuit 160, and gate driver signal 188 for the gate driver circuit 176.

In some embodiments, a third transformer/power supply can be eliminated to achieve reinforced or double Insulation, saving board space. The control power supply 148 can eliminate six of seven windings that were used for the gate driver circuit 160. The remaining winding can be at a 5.0V potential. In this configuration, the control power supply 148 can provide a second stage of basic insulation. The control power supply may not have to meet a 12 KV impulse test, just an 8 KV test. The control power supply 148 may include a 24 V input, which could reference ground.

It is to be appreciated that the block diagram of the control circuits represent a system design, rather than an actual hardware installation.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. An electrical device having a power circuit, the device comprising:
    a first insulation device to provide a level of basic insulation between the power circuit and a user of the electrical device, wherein the first insulation device isolates a low voltage power from an additive insulation device and a high voltage power; and
    the additive insulation device in series with the first insulation device, the additive insulation device to increase the level of basic insulation to a level of double insulation or reinforced insulation between the power circuit and the user of the device, and wherein the additive insulation device isolates a user accessible low voltage from a control device and the low voltage power.

2. The electrical device according to claim 1,
    wherein the low voltage power is provided by a control power supply.

3. The electrical device according to claim 1,
    wherein the low voltage power is provided by a linear regulator.

4. The electrical device according to claim 1,
    wherein the electrical device comprises a variable speed motor drive.

5. The electrical device according to claim 4,
    wherein the additive insulation device is electrically positioned between a control pod and a gate driver circuit.

6. A variable frequency drive comprising:
    control circuitry coupled to a power circuit, a power module and an inverter,
    the control circuitry including a control pod and a gate driver circuit, the control pod to provide control signals to the gate driver circuit;
    the control circuitry including a first insulation device to provide a level of basic insulation between the power circuit and a user of the variable frequency drive; and
    the control circuitry including an additive insulation device, the additive insulation device to increase the level of basic insulation to a level of double insulation or reinforced insulation between the power circuit and the user of the variable frequency drive, the additive insulation being electrically positioned between the control pod and the gate driver circuit.

7. The variable frequency drive according to claim 6,
    wherein the first insulation device comprises an optocoupler.

8. The variable frequency drive according to claim 7,
    wherein the optocoupler is an 8 mm optocoupler.

9. The variable frequency drive according to claim 6,
    wherein the additive insulation device comprises an additive optocoupler.

10. The variable frequency drive according to claim 9,
    wherein the additive optocoupler is an 8 mm additive optocoupler.

11. The variable frequency drive according to claim 6,
    wherein the first insulation device and the additive insulation device each comprise an optocoupler.

12. A method for providing additive insulation to an electrical device having a power circuit, the method comprising:
    providing a first insulation device for providing a level of basic insulation between the power circuit and a user of the electrical device;
    providing an additive insulation device in series with the first insulation device, the additive insulation device for increasing the level of basic insulation to a level of double insulation or reinforced insulation between the power circuit and the user of the electrical device;
    using the first insulation device to isolate a low voltage power from the additive insulation device and a high voltage power; and
    using the additive insulation device to isolate a user accessible low voltage from a control device and the low voltage power.

13. The method according to claim 12
    wherein the electrical device comprises a variable speed motor drive.

14. The method according to claim 13, further including electrically positioning the additive insulation device between a control pod and a gate driver circuit.

15. The method according to claim 12,
    wherein the first insulation device comprises an optocoupler.

16. The method according to claim 12,
    wherein the additive insulation device comprises an additive optocoupler.

17. The method according to claim 12
    wherein the low voltage power is provided by a control power supply.

18. The method according to claim 12
    wherein the low voltage power is provided by a linear regulator.

19. The method according to claim 12 wherein the user accessible low voltage is coupled to a plurality of additive optocouplers.

\* \* \* \* \*